US009212886B2

(12) United States Patent
Butirro

(10) Patent No.: US 9,212,886 B2
(45) Date of Patent: Dec. 15, 2015

(54) DEVICE FOR FACILITATING ALIGNMENT WITH A TARGET LINE

(71) Applicant: Christopher J Butirro, Hoffman Estates, IL (US)

(72) Inventor: Christopher J Butirro, Hoffman Estates, IL (US)

( * ) Notice: Subject to any disclaimer, the term of this patent is extended or adjusted under 35 U.S.C. 154(b) by 147 days.

(21) Appl. No.: 14/034,835

(22) Filed: Sep. 24, 2013

(65) Prior Publication Data

US 2015/0082645 A1    Mar. 26, 2015

(51) Int. Cl.
G01B 5/25     (2006.01)
G01B 5/00     (2006.01)
A63B 69/36    (2006.01)

(52) U.S. Cl.
CPC .............. G01B 5/0023 (2013.01); A63B 69/36 (2013.01); G01B 5/25 (2013.01)

(58) Field of Classification Search
CPC ......... A63B 69/36; G01B 5/0023; G01B 5/25
USPC ............................ 33/481, 485, 508, 562, 566
See application file for complete search history.

(56) References Cited

U.S. PATENT DOCUMENTS

| 1,485,272 | A  | 2/1924  | Kinsman |
| 4,077,632 | A  | 3/1978  | Taylor |
| 4,128,244 | A  | 12/1978 | Duclos |
| 4,708,346 | A  | 11/1987 | Pierce et al. |
| 6,405,450 | B1 | 6/2002  | Wood et al. |
| 6,471,599 | B2 | 10/2002 | Ford |
| 6,729,967 | B2 | 5/2004  | Ford |
| 6,754,970 | B2 | 6/2004  | Daniels |
| 6,974,395 | B1 | 12/2005 | Rioux et al. |
| 2013/0012331 | A1 | 1/2013 | Goldsmith et al. |

FOREIGN PATENT DOCUMENTS

| GB | 243435     | 11/1925 |
| WO | 2005063343 | 7/2005  |

OTHER PUBLICATIONS

SwingMark Golf Swing Trainer, D.W. Quail Golf, Jun. 13, 2013, LINK: http://www.dwquailgolf.com/golf-training-aids/swingmark-golf-swing-trainer.html.
Ruler with Stencil, Bing Images, Jun. 13, 2013, LINK: http://www.bing.com/images/search?q=ruler+with+line+stencil&qs=n&form=QBIR&pq=ruler+with+line+stencil&sc=0-12&sp=-1&sk=#view=detail&id=52EAD1C59C8C63AB0B102BCADCB6CA6E01EA2F83&selectedIndex=24.
The Creative Process of Professional Designers, Six Revisions, Sep. 12, 2012, Link: http://sixrevisions.com/interviews/creative-process-professional-designers/.
Construction Template Ruler, Ali Express, Jun. 13, 2013, Link: http://www.aliexpress.com/store/product/Construction-template-ruler-5501-wholesale-and-retail-20-pieces-lot/600128_250561992.html.

Primary Examiner — G. Bradley Bennett
(74) Attorney, Agent, or Firm — Valauskas Corder LLC

(57) ABSTRACT

A device for marking an indicator on a face of a golf club head in order to facilitate alignment of a golf club and body position of a golfer with a target line. The device includes a graduation element configured to measure the length of a groove on the face of the golf club head in order to find a midpoint of the groove, a tab component protruding from a surface of the device configured to be inserted into a groove of the face of the golf club head, and a marking component defined by an aperture extending through the device used to mark an indicator being formed vertically through the midpoint on the face of the golf club head.

8 Claims, 5 Drawing Sheets

DEVICE FOR FACILITATING ALIGNMENT WITH A TARGET LINE

FIELD OF THE INVENTION

The invention relates generally to the field of golf and more particularly to a device used to facilitate alignment of a golf club—specifically, the face of a golf club head—body position of a golfer with a target line, e.g., the line extending from a golf ball with a target such as a flag stick or hole in the ground. Specifically, the device enables a user to mark an indicator on the face of a golf club head that is used to align the golf club and body position of the golfer to the target line.

BACKGROUND

Golf is a sport in which competing players—"golfers"—hit golf balls with one or more golf clubs into cups on a course. The overall goal is to position a golf ball into a cup on the course with the fewest number of hits or strokes using a golf club. The game is played on a golf course generally consisting of a specific layout and arrangement of either 9 or 18 holes. Each hole on the course includes a tee box from which the golfers start from and a putting green containing the cup or actual hole in the ground. Often times the actual hole is identified by a flag stick or "pin". For purposes of this application, the term "target" may refer to the cup or hole and in certain instances may further include the flag stick or pin. In instances when a golfer is practicing at a driving range, the term "target" may refer to the marker or any identifying object on the range.

One important factor—maybe the only important factor to some golfers—in the game of golf is accurate alignment. Prior to hitting the golf ball, the golfer typically follows a process of standing behind the golf ball and selecting a primary aiming point—a target—to sight the target line. The target line is the line extending from the golf ball to the target, i.e. cup, hole, flag stick, pin, marker, or any identifying object. Some golfers then choose a secondary aiming point. Typically the secondary aiming point is approximately two or three feet in front of the golf ball and is positioned directly on the target line. The golfer then aims the bottom edge of the golf club head so that it is perpendicular to the target line. This process may be inconsistent between strokes of a golfer without the use of an alignment device.

While prior art alignment devices exist, they have a plethora of drawbacks. For example, some prior art alignment devices are not readily available as a retrofit to conventional golf clubs. Certain other prior art alignment devices are meant for use on the golf ball itself, which may be problematic since it is illegal in the game of golf to touch the golf ball after it has been hit (unless the golfer is on the putting green) and if a golfer is prone to losing golf balls. Yet certain other prior art alignment devices provide for marking on the golf club, but are complex and intricate such that they are complicated and time consuming to use.

There remains a need for a device that can be used with all types of golf clubs and facilitates the accurate alignment of a golf club—specifically, the head of the golf club—and body position of a golfer with a target line. Accurate alignment improves contact between the face of a golf club head and the golf ball to result in more precise strokes.

SUMMARY OF THE INVENTION

The invention solves the problems of the prior art devices by providing a portable, easy to use template for marking an indicator on a face of a golf club head to facilitate alignment of a golf club and body position of a golfer with a target line. The device includes a graduation element, a tab component, and a marking component. The graduation element is configured to measure the length of a groove on the face of the golf club head in order to find a midpoint of the groove. The tab component protrudes from the device and is configured to be inserted into a groove on the face of the golf club head. The marking component is defined by an aperture used to mark an indicator through the midpoint on the face of the golf club head. More specifically, the marking component is used to form an indicator vertically through the midpoint such that the indicator is perpendicular to one or more grooves on the face of the golf club head.

The device according to the invention can be used with existing golf clubs and can be used according to the needs of the individual golfer. The device according to the invention may facilitate alignment of the golf ball to the target to improve the golfer's game.

The invention and its attributes and advantages may be further understood and appreciated with reference to the detailed description below, taken in conjunction with the accompanying drawings.

BRIEF DESCRIPTION OF THE FIGURES

The accompanying drawings, which are incorporated in and constitute a part of this specification, illustrate an implementation of the invention and, together with the description, serve to explain the advantages and principles of the invention.

DETAILED DESCRIPTION OF THE INVENTION

Figure 1:
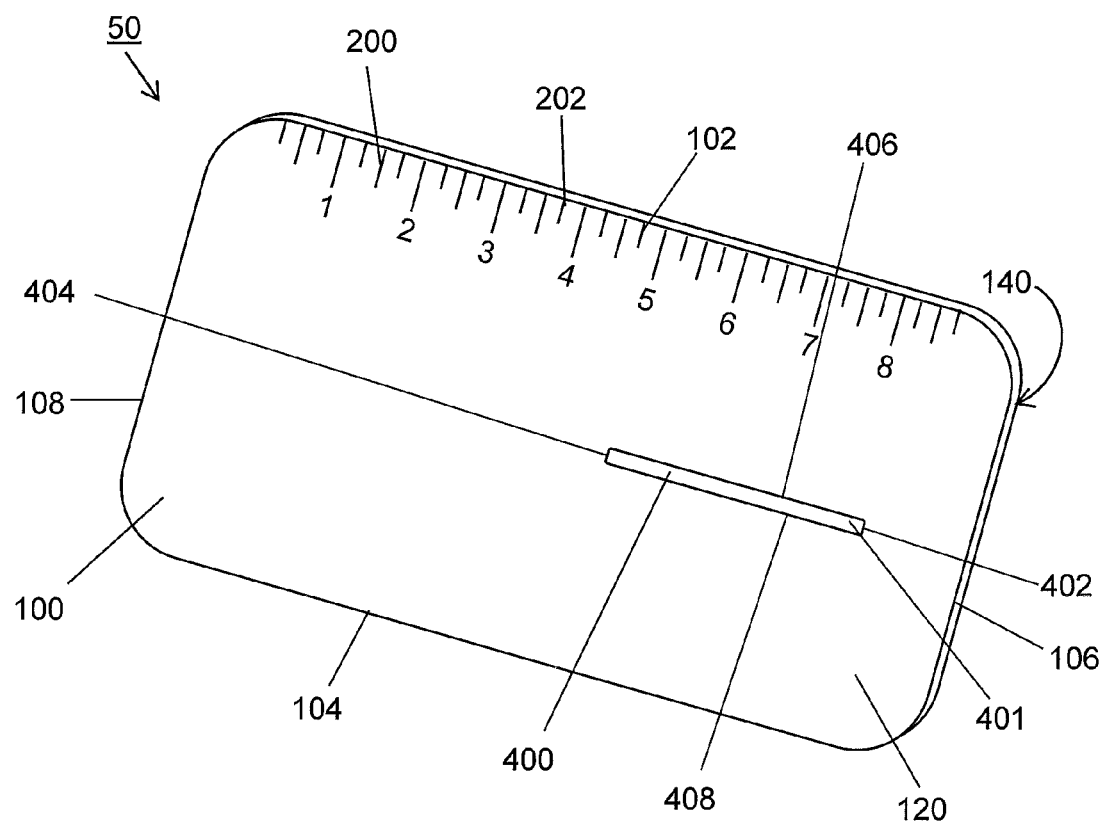
FIG. 1 is a front perspective view of the device according to the invention.

According to the invention, a device 50 for marking an indicator on a face of a golf club head by a user (otherwise referred to as "a golfer") to facilitate alignment of a golf club—specifically, the head of the golf club—and body position of a golfer with a target line includes a body 100 defined by one or more borders. In one embodiment of the device 50 as shown more specifically in FIG. 1 through FIG. 4, the device 50 includes first border 102, a second border 104, a third border 106 and a fourth border 108, a front surface 120 and a back surface 140. Although the body component 100 is shown as a rectangular shape, it is contemplated that the body component 100 may be of any shape. It is further contemplated that the body component 100 is fabricated from a durable material such as plastic or metal.

Figure 3:
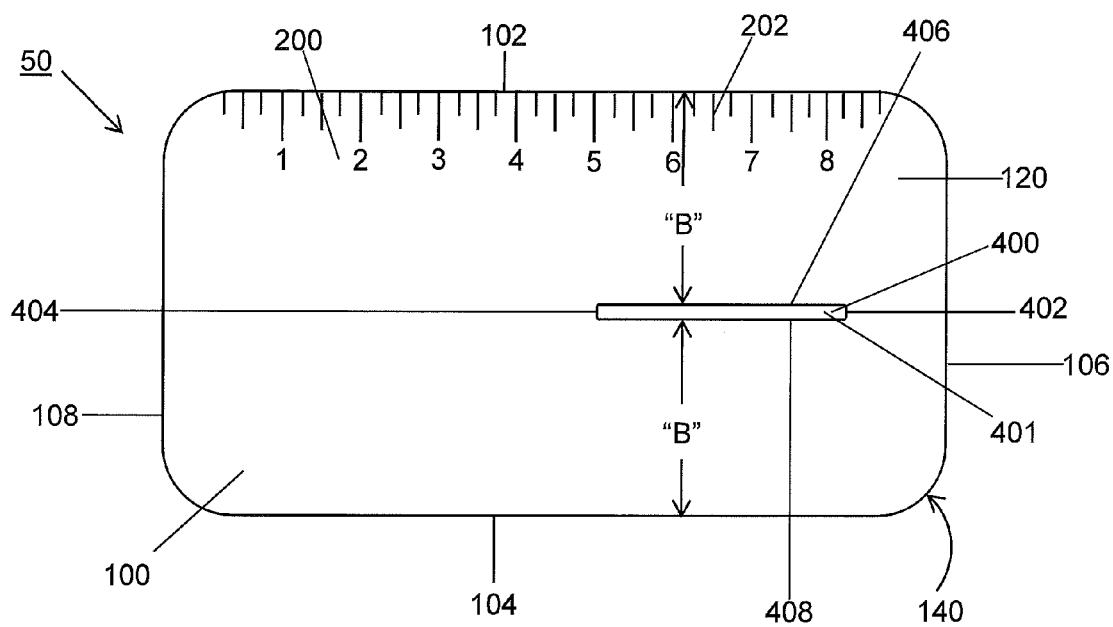
FIG. 3 is a front view of the device according to the invention.

The body 100 includes a graduation element 200 positioned on the front surface 120 as shown in FIG. 1 and FIG. 3. The graduation element 200 is in proximity to the first border 102. Specifically, the graduation element 200 includes a plurality of lines 202 that indicate a measurement of distance. The graduation element 200 may be fabricated, for example, by molding such as injection, forming such as stamping, or machining such as etching.

The body 100 further includes a tab component 300 protruding from the back surface 140. The tab component 300 is defined by a plurality of faces. In one embodiment of the tab component 300 as shown more specifically in FIG. 2 and FIG. 4, the tab component 300 includes a first face 302, a second face 304, a third face 306, and a fourth face 308. The tab component 300 further includes a top surface 310 and a bottom surface 312. The tab component 300 may be fabricated, for example, by molding such as injection, forming such as notching or bending the tab component 300 from the body 100, or joining such as welding the bottom surface 312 of the tab component 300 to the back surface 140 of the body 100.

Figure 4:
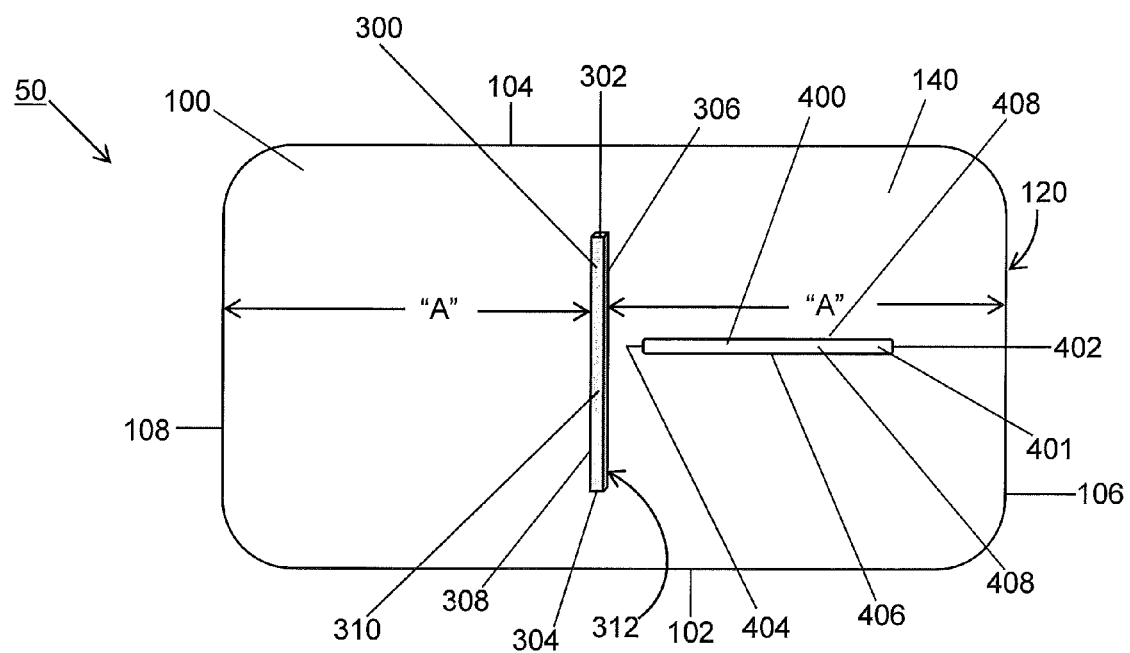
FIG. 4 is a rear view of the device according to the invention.

In one embodiment, the tab component 300 is positioned equidistant between the one or more borders of the body 100. As shown in FIG. 4, the tab component 300 is positioned equidistant between the third border 106 and the fourth border 108 as shown by arrows "A". The first face 302, the second face 304, the third face 306, and the fourth face 308 are perpendicular to the back surface 140 of the body 100 such that the top surface 310 is positioned a certain distance from the back surface 140. More specifically, the tab component 300 has a length defined by the distance between the first face 302 and the second face 304 and a width defined by the distance between the third face 306 and the fourth face 308.

In certain embodiments, the bottom surface 312 of the tab component 300 is integrated with the back surface 140 of the body 100, for example, in instances when the tab component 300 is formed from the body 100 such as by notching or bending.

Although the tab component 300 is shown as a rectangular shape, it is contemplated that the tab component 300 may be of any shape.

The body 100 further includes a marking component 400 defined by an aperture 401 extending through the front surface 120 and the back surface 140. The marking component 400 includes a plurality of edges—a first edge 402, a second edge 404, a third edge 406, and a fourth edge 408. The marking component 400 is of a length defined by the distance between the first edge 402 and the second edge 404 and a width defined by the distance between the third edge 406 and the fourth edge 408. The marking component 400 may be fabricated, for example, by molding such as injection, forming such as stamping or cutting, or machining such as laser cutting or drilling.

In one embodiment, the marking component 400 is positioned equidistant between the one or more borders of the body 100. As shown in FIG. 3, the marking component 400 is positioned equidistant between the first border 102 and the second border 104 as shown by arrows "B". More specifically, the first edge 402 and the second edge 404 are positioned parallel to the third border 106 and the fourth border 108 of the body 100 and the third edge 406 and the fourth edge 408 are positioned parallel to the first border 102 and the second border 104 of the body 100. Although the marking component 400 is shown as a rectangular shape, it is contemplated that the marking component 400 may be of any shape.

Figure 2:
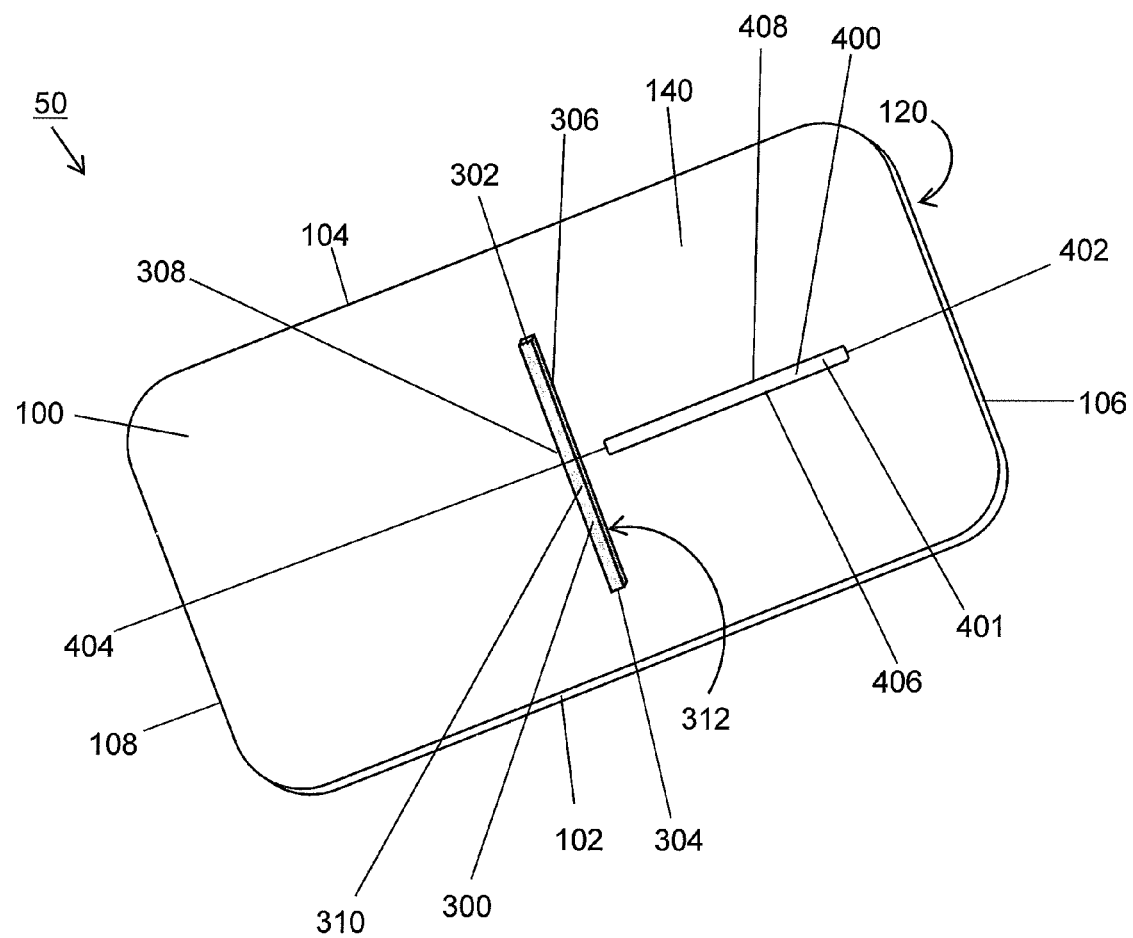
FIG. 2 is a rear perspective view of the device according to the invention.

As can be seen in FIG. 2 and FIG. 4, the tab component 300 is positioned perpendicular to the marking component 400. Specifically, the length defined by the distance between the first face 302 and the second face 304 of the tab component 300 is perpendicular to the length defined by the distance between the first edge 402 and the second edge 404 of the marking component 400.

Figure 5:
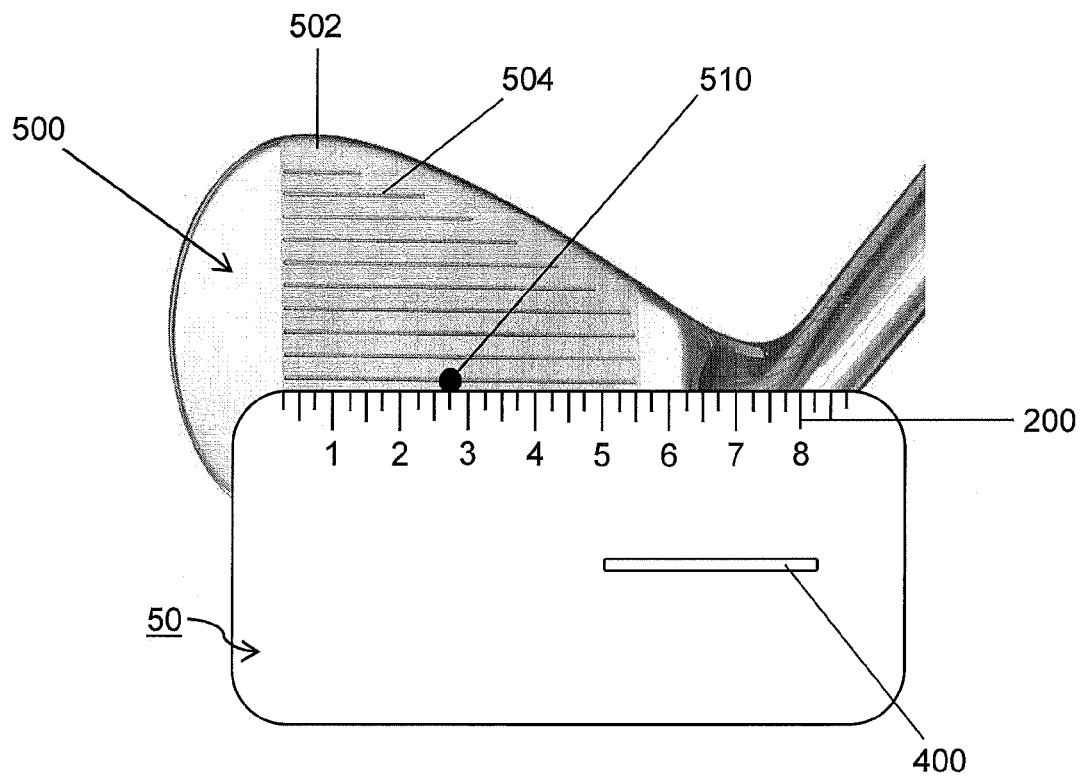
FIG. 5 illustrates the device as used with a golf club for marking an indicator according to the invention.

As shown in FIG. 5 through FIG. 8, a golf club head 500 includes a face 502 with a plurality of grooves 504. As shown in FIG. 5, a user positions the device 50 on the face 502 of the golf club head 500 so that the graduation element 200 measures the length of one groove 504 to obtain a groove measurement. The groove measurement is used create a first indicator 510 on the face 502 of the golf club head 500 at a midpoint of the groove measurement.

Figure 6:
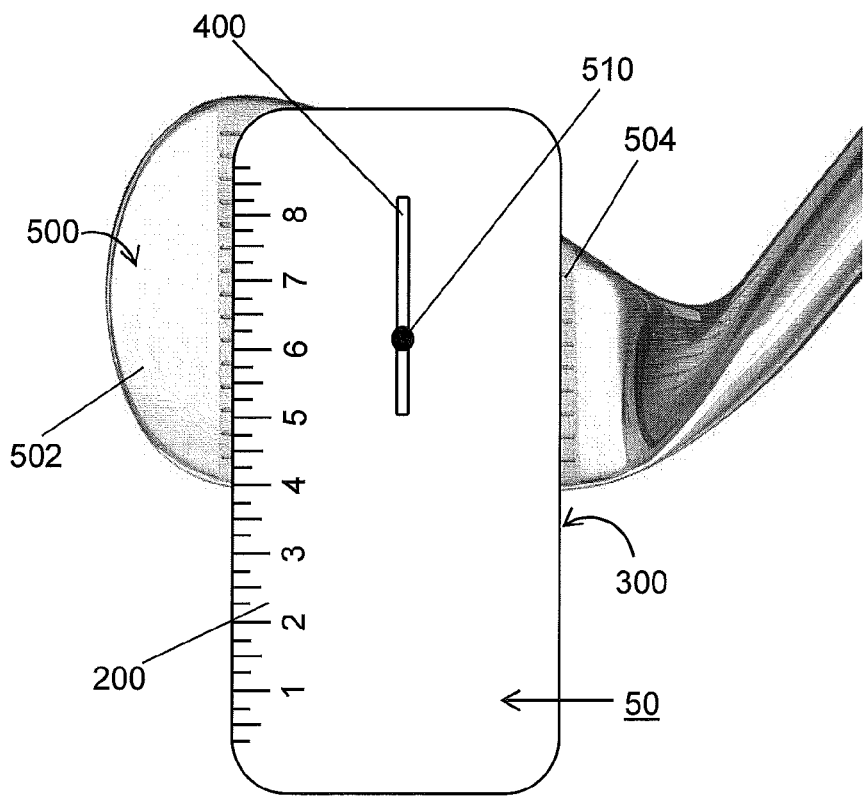
FIG. 6 illustrates the device as used with a golf club for marking an indicator according to the invention.

After the first indicator 510 is established, a user positions the device 50 so that the tab component 300 on the back surface 140 of the body 100 is inserted into a groove 504 as shown in FIG. 6. Specifically, the third face 306 and the fourth face 308 of the tab component 300 are located within the groove 504 of the face 502 of the golf club head 500 so that the first indicator 510 is visible through the marking component 400.

Figure 7:
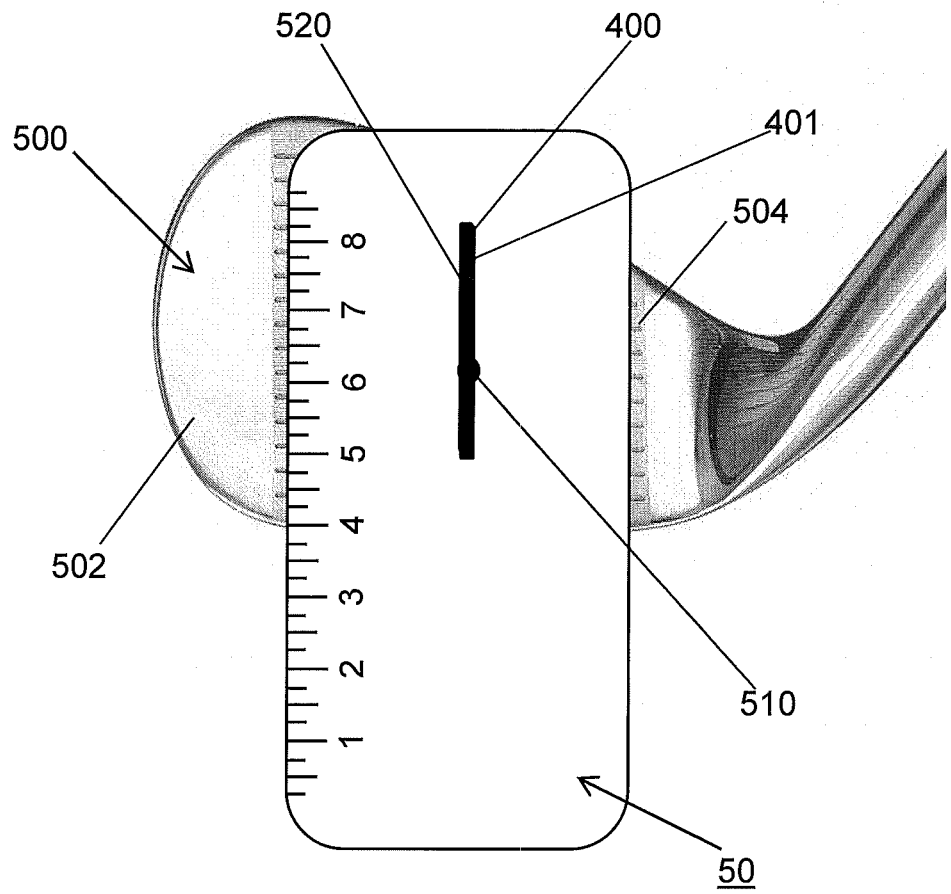
FIG. 7 illustrates the device as used with a golf club for marking an indicator according to the invention.
Figure 8:
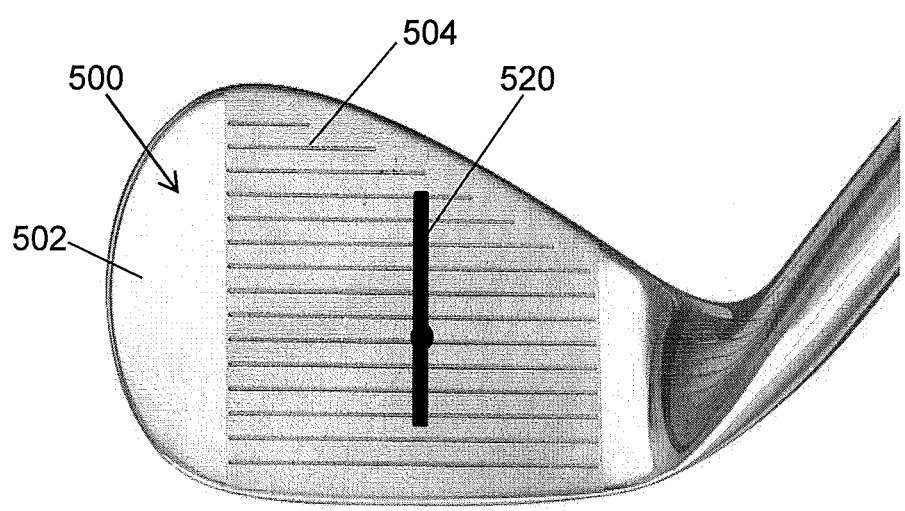
FIG. 8 illustrates the indicator as marked on the face of a golf club head using the device according to the invention.

As shown in FIG. 7, the user creates a second indicator 520 on the face 502 of the golf club head 500 using the aperture 401 defining the marking component 400. Specifically, the user creates the second indicator 520 vertically through the first indicator 510. As shown in FIG. 8, the second indicator 520 is perpendicular to one or more grooves 504 on the face 502 of the golf club head 500 in order to facilitate alignment of a golf ball with a target.

In one embodiment of the invention, a user can stand behind the golf ball and sight the target line extending from the golf ball to the target, i.e. cup, hole, flag stick, pin, marker, or any identifying object. The user may then choose a point directly on the target line that is approximately two or three feet in front of the golf ball. The golfer may then aim the second indicator 520 on the face 502 of the golf club head 500 through the golf ball and the point directly on the target line in order to achieve accurate alignment of a golf club and body position of a golfer with a target line.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A device for marking an indicator on a face of a golf club head by a user to facilitate alignment of a golf club and body position of the user with a target line, the face of the golf club including a plurality of grooves, the device comprising:
   a body defined by one or more borders, a from surface and a back surface;
   a graduation element positioned on the from surface of the body, the graduation element including a plurality of lines that indicate a measurement of distance;
   a tab component protruding from the back surface of the body; and
   a marking component defined by an aperture, wherein the aperture includes a plurality of edges extending through the front surface and the back surface,
   the graduation element configured to measure the length of one groove of the plurality of grooves on the face of the golf club head to obtain a groove measurement used to create a first indicator on the face of the golf club head at a midpoint of the groove measurement, the tab component configured to be inserted into a groove of the plurality of grooves so that the first indicator is visible through the marking component in order to create second indicator on the face of the golf club head using the aperture defining the marking component, and the second indicator is formed vertically through the midpoint such that the second indicator is perpendicular to the plurality of grooves on the face of the golf club head.

2. The device for marking an indicator on a face of a golf club head by a user according to claim 1, wherein the graduation element is positioned in proximity to one of the one or more borders of the body.

3. The device for marking an indicator on a face of a golf club head by a user according to claim 1, wherein the tab component is positioned equidistant between the one or more borders of the body.

4. The device for marking an indicator on a face of a golf club head by a user according to claim 1, wherein the marking component is positioned equidistant between the one or more borders of the body.

5. The device for marking an indicator on a face of a golf club head by a user according to claim 1, wherein the marking component is positioned perpendicular to the tab component.

6. The device for marking an indicator on a face of a golf club head by a user according to claim 1, wherein the device is fabricated from metal.

7. A device for marking an indicator on a face of a golf club head by a user to facilitate alignment of a golf club and body position of the user with a target line, the face of the golf club including a plurality of grooves, the device comprising:

- a body defined by a first border, a second border, a third border and a fourth border, a front surface and a back surface;
- a graduation element positioned on the front surface of the body, the graduation element in proximity to the first border;
- a tab component protruding from the back surface of the body and positioned equidistant between the third border and the fourth border of the body;
- a marking component defined by an aperture extending through the front surface and the back surface, the marking component positioned equidistant between the first border and the second border of the body;
- the graduation element being configured to measure the length of one groove of the plurality of grooves on the face of the golf club head to obtain a groove measurement so that the user can create a first indicator on the face of the golf club head at a midpoint of the groove measurement,
- the tab component configured to be inserted into a groove of the plurality of grooves so that the first indicator is visible through the marking component such that the user can create a second indicator on the face of the golf club head using the aperture defining the marking component,
- the second indicator formed vertically through the midpoint such that the second indicator is perpendicular to the plurality of grooves on the face of the golf club head.

8. The device for marking an indicator on a face of a golf club head by a user according to claim 7, wherein the device is fabricated from metal.

\* \* \* \* \*